US012561981B2

(12) United States Patent
Mochinaga et al.

(10) Patent No.: US 12,561,981 B2
(45) Date of Patent: Feb. 24, 2026

(54) STORAGE-RETRIEVAL MANAGEMENT DEVICE, STORAGE-RETRIEVAL MANAGEMENT SYSTEM, AND STORAGE-RETRIEVAL MANAGEMENT METHOD

(71) Applicant: Panasonic Intellectual Property Management Co., Ltd., Osaka (JP)

(72) Inventors: Kazuhiro Mochinaga, Osaka (JP); Taku Kariyazaki, Osaka (JP); Wataru Suda, Osaka (JP); Shinichi Horii, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 316 days.

(21) Appl. No.: 18/546,576

(22) PCT Filed: Feb. 22, 2022

(86) PCT No.: PCT/JP2022/007105
§ 371 (c)(1),
(2) Date: Aug. 15, 2023

(87) PCT Pub. No.: WO2022/181575
PCT Pub. Date: Sep. 1, 2022

(65) Prior Publication Data
US 2024/0135715 A1 Apr. 25, 2024
US 2024/0233384 A9 Jul. 11, 2024

(30) Foreign Application Priority Data

Feb. 25, 2021 (JP) ................................. 2021-028423

(51) Int. Cl.
*G06V 20/52* (2022.01)
*F25D 23/02* (2006.01)
(Continued)

(52) U.S. Cl.
CPC ........... *G06V 20/52* (2022.01); *F25D 23/028* (2013.01); *G06T 7/246* (2017.01); *G06V 20/68* (2022.01); *F25D 2500/06* (2013.01)

(58) Field of Classification Search
CPC ...... G06V 20/52; G06V 20/68; F25D 23/028; F25D 2500/06; G06T 7/246
See application file for complete search history.

(56) References Cited

U.S. PATENT DOCUMENTS

2015/0199810 A1* 7/2015 Lee ........................ G06N 5/025
382/103
2016/0021342 A1 1/2016 Aso et al.
(Continued)

FOREIGN PATENT DOCUMENTS

CN 110689560 A * 1/2020 ............. G06T 7/248
JP 2015-081762 A 4/2015
(Continued)

OTHER PUBLICATIONS

International Search Report issued on Apr. 5, 2022 in International Patent Application No. PCT/JP2022/007105, with English translation.

*Primary Examiner* — Casey L Kretzer
(74) *Attorney, Agent, or Firm* — Rimon P.C.

(57) ABSTRACT
A storage-retrieval management device includes: an image capturer that captures, from above a refrigerator that includes a main body and a door attached to the main body, images of the refrigerator with the door in an open state; a setter that sets a boundary along contours of the main body and the door in the images; and a determiner that determines whether an object is stored into the refrigerator or whether the object is retrieved from the refrigerator, based on whether the object is moved beyond the boundary that is set, the object being captured in one or more of the images.

14 Claims, 12 Drawing Sheets

(51) Int. Cl.
      *G06T 7/246*          (2017.01)
      *G06V 20/68*          (2022.01)

(56)                    References Cited

U.S. PATENT DOCUMENTS

2017/0323156  A1 *   11/2017   Townsend .............. G06V 20/52
2021/0254884  A1 *    8/2021   Hong ................... F25D 23/028

FOREIGN PATENT DOCUMENTS

JP        2016-023854  A      2/2016
JP        2020-041761  A      3/2020
WO     WO-2016036015  A1 *   3/2016   ........... G06Q 10/087

* cited by examiner

FIG. 6

| Distance to right door | R1 | R2 | R3 | Distance to left door | L1 | L2 | L3 |
|---|---|---|---|---|---|---|---|
| Up to 5 cm (Closed state) | (x1, y1) | (x2, y2) | (x3, y3) | Up to 5 cm (Closed state) | (X1, Y1) | (X2, Y2) | (X3, Y3) |
| 5 to 10 cm (Half-opened state) | : | : | : | 5 to 10 cm (Half-opened state) | : | : | : |
| 10 to 15 cm (Opened state) | : | : | : | 10 to 15 cm (Opened state) | : | : | : |
| 15 cm or more (Fully opened state) | : | : | : | 15 cm or more (Fully opened state) | : | : | : |

| Type of food | Quantity |
|--------------|----------|
| Drink        | 3        |
| Vegetable    | 5        |
| Meat         | 2        |
| :            | :        |

STORAGE-RETRIEVAL MANAGEMENT DEVICE, STORAGE-RETRIEVAL MANAGEMENT SYSTEM, AND STORAGE-RETRIEVAL MANAGEMENT METHOD

CROSS-REFERENCE OF RELATED APPLICATIONS

This application is the U.S. National Phase under 35 U.S.C. § 371 of International Patent Application No. PCT/JP2022/007105, filed on Feb. 22, 2022, which in turn claims the benefit of Japanese Patent Application No. 2021-028423, filed on Feb. 25, 2021, the entire disclosures of which Applications are incorporated by reference herein.

TECHNICAL FIELD

The present disclosure relates to a storage-retrieval management device, a storage-retrieval management system, and a storage-retrieval management method.

BACKGROUND ART

Conventionally, technology that relates to a repository in which objects are stored has been proposed. Patent Literature (PTL) 1 discloses a storage-retrieval management system for refrigerators. The storage-retrieval management system disclosed in PTL 1 determines that objects are stored into or retrieved from a refrigerator using a learning model. The learning model outputs a result of storage/retrieval determination if information obtained by a sensor provided in the refrigerator is input.

CITATION LIST

Patent Literature

[PTL 1] Japanese Unexamined Patent Application Publication No. 2020-41761

SUMMARY OF INVENTION

Technical Problem

The present disclosure provides a storage-retrieval management device, a storage-retrieval management system, and a storage-retrieval management method that can improve accuracy of determining storage and retrieval of an object into/from a repository.

Solution to Problem

A storage-retrieval management device according to an aspect of the present disclosure includes: an image capturer that captures, from above a repository that includes a main body and a door attached to the main body, images of the repository with the door in an open state; a setter that sets a boundary along contours of the main body and the door in the images; and a determiner that determines whether an object is stored into the repository or whether the object is retrieved from the repository, based on whether the object is moved beyond the boundary that is set, the object being captured in one or more of the images.

A storage-retrieval management system according to an aspect of the present disclosure includes: an image capturer that captures, from above a repository that includes a main body and a door attached to the main body, images of the repository with the door in an open state; a setter that sets a boundary along contours of the main body and the door in the images; and a determiner that determines whether an object is stored into the repository or whether the object is retrieved from the repository, based on whether the object is moved beyond the boundary that is set, the object being captured in one or more of the images.

A storage-retrieval management method according to an aspect of the present disclosure includes: capturing, from above a repository that includes a main body and a door attached to the main body, images of the repository with the door in an open state; setting a boundary along contours of the main body and the door in the images; and determining whether an object is stored into the repository or whether the object is retrieved from the repository, based on whether the object is moved beyond the boundary that is set, the object being captured in one or more of the images.

Advantageous Effects of Invention

A storage-retrieval management device, a storage-retrieval management system, and a storage-retrieval management method according to the present disclosure can improve accuracy of determining storage and retrieval of an object into/from a repository.

BRIEF DESCRIPTION OF DRAWINGS

FIG. 6 illustrates an example of setting information.

DESCRIPTION OF EMBODIMENTS

Figure 1:
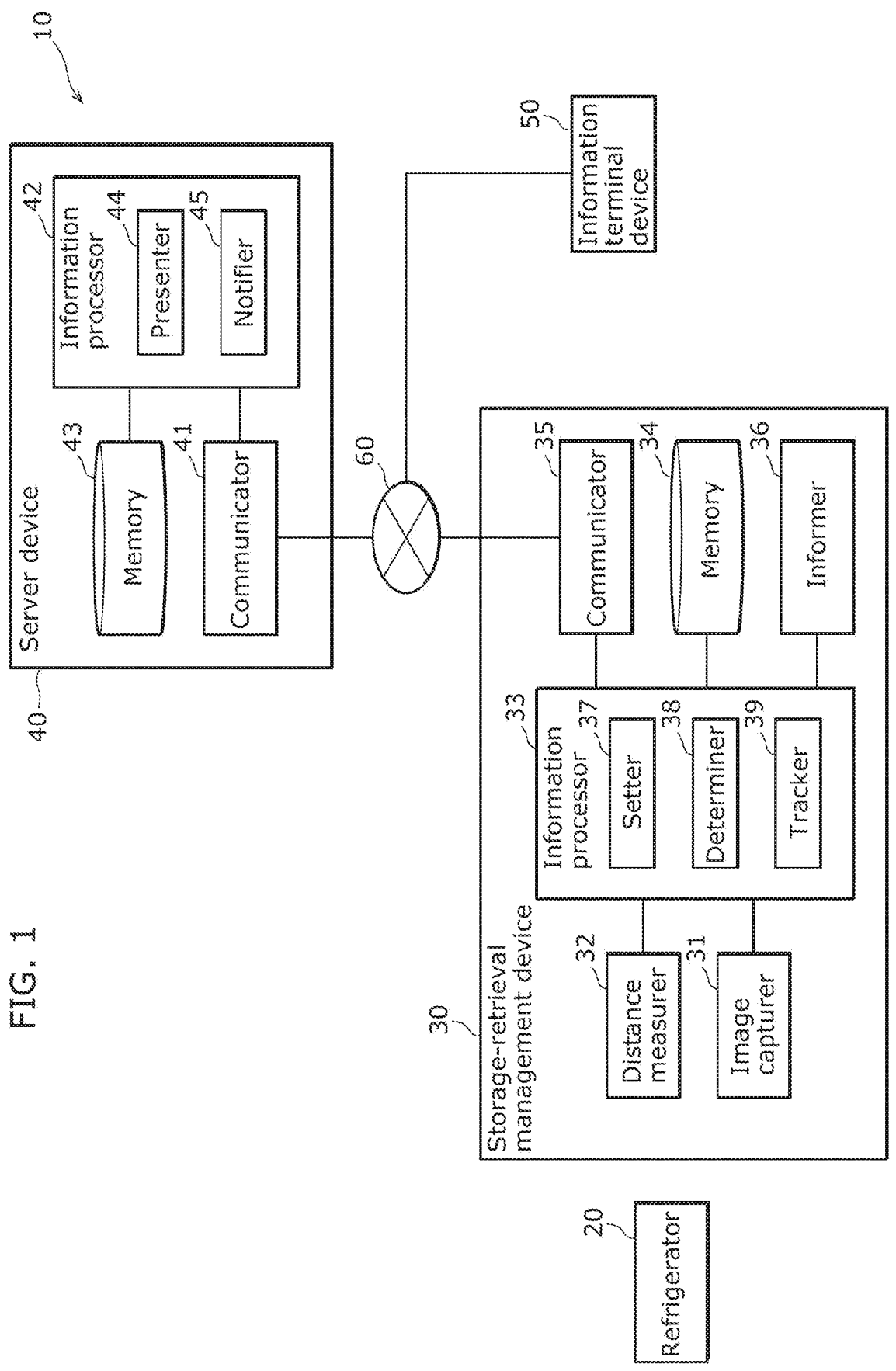
FIG. 1 is a block diagram illustrating a functional configuration of a storage-retrieval management system according to an embodiment.

The following gives a specific description of embodiments with reference to the drawings. Note that the embodiments described below each show a general or specific example. The numerical values, shapes, materials, elements, the arrangement and connection of the elements, steps, the processing order of the steps, and others indicated in the following embodiments are examples, and therefore are not intended to limit the present disclosure. Further, among the elements in the following embodiments, elements not recited in any of the independent claims are described as optional elements.

Note that the diagrams are schematic diagrams, and do not necessarily provide strict illustration. In the drawings, the same reference sign is given to a substantially same element, and a redundant description thereof may be omitted or simplified.

Embodiment

Configuration

First, a configuration of a storage-retrieval management system according to an embodiment is to be described. FIG. 1 is a block diagram illustrating a functional configuration of the storage-retrieval management system according to the embodiment.

Storage-retrieval management system 10 illustrated in FIG. 1 is a system for managing food stored in refrigerator 20. Storage-retrieval management system 10 includes refrigerator 20, storage-retrieval management device 30, server device 40, and information terminal device 50.

Figure 2:
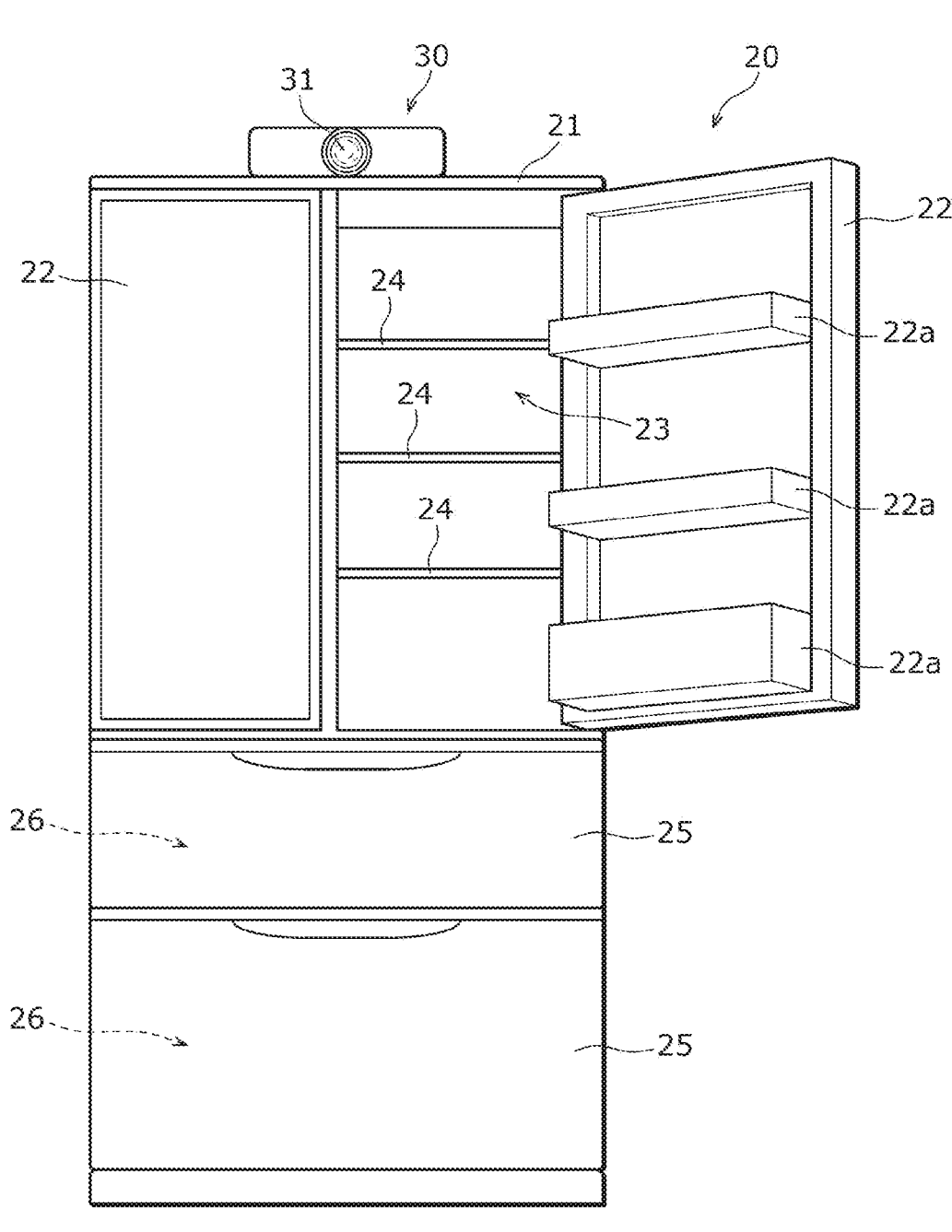
FIG. 2 is an external view of a refrigerator and a storage-retrieval management device included in the storage-retrieval management system according to the embodiment.

Refrigerator 20 is an example of a repository, and is provided in, for instance, a house of a user to refrigerate food. FIG. 2 is an external view of refrigerator 20 (and storage-retrieval management device 30). As illustrated in FIG. 2, refrigerator 20 includes main body 21, doors 22 for access to first storage space 23 inside main body 21, shelves 24 provided in first storage space 23, and drawers 25. By opening door(s) 22, refrigerator 20 is brought into a state in which food items can be placed on shelves 24 (that is, food can be stored in first storage space 23). Furthermore, by opening door(s) 22, refrigerator 20 is brought into a state in which food items can be stored in door compartments 22a provided inside of each door 22. By opening drawer 25, refrigerator 20 can be brought into a state in which food can be stored in second storage space 26 in drawer 25. In the example in FIG. 2, refrigerator 20 includes two doors 22 that cover first storage space 23, but nevertheless, single door 22 may cover first storage space 23.

Storage-retrieval management device 30 is attached onto, for example, a top surface of refrigerator 20, and performs information processing for managing food stored in refrigerator 20. Storage-retrieval management device 30 is retrofitted onto existing refrigerator 20, for example, but may be provided in refrigerator 20. Thus, storage-retrieval management device 30 may be a device separate from refrigerator 20, or may be a device manufactured integrally with refrigerator 20. As illustrated in FIG. 1, storage-retrieval management device 30 includes image capturer 31, distance measurer 32, information processor 33, memory 34, communicator 35, and informer 36.

Image capturer 31 captures, from above refrigerator 20, a video showing a scene in which food is put into or taken out of refrigerator 20. Thus, image capturer 31 captures, from above refrigerator 20, a video of refrigerator 20 with door(s) 22 in an open state, for example. The video includes, as subjects, doors 22, door compartments 22a, first storage space 23, shelves 24, drawers 25, and a floor of the room space in front of refrigerator 20. Image capturer 31 is implemented by, for example, a camera that includes a fisheye lens, but may be implemented by a camera that includes a normal lens.

Note that image capturer 31 may generate a plurality of images (still images) by capturing a scene in which an object is put into or taken out of refrigerator 20 at preset time intervals, and thus does not necessarily need to capture a video. Image capturer 31 is attached to a casing of storage-retrieval management device 30, but may be attached to refrigerator 20 apart from the casing of storage-retrieval management device 30. Thus, image capturer 31 may be retrofitted onto refrigerator 20. In this case, image capturer 31 may include a magnet, a suction cup, or a clip, for instance, as a structure with which image capturer 31 can be retrofitted onto refrigerator 20.

From above refrigerator 20, distance measurer 32 measures a distance from distance measurer 32 to each door 22. Thus, distance measurer 32 measures degrees to which doors 22 are opened. Distance measurer 32 is implemented by an infrared distance measurer sensor, for example. Distance measurer 32 can separately measure a distance from distance measurer 32 to right door 22 and a distance from distance measurer 32 to left door 22.

Note that as described later, distance measurer 32 is used to measure degrees to which doors 22 are opened. Storage-retrieval management device 30 may include another sensor for measuring degrees to which doors 22 are opened, such as an angular sensor instead of distance measurer 32. A sensor for measuring degrees to which doors 22 are opened may be included in refrigerator 20, and in this case, storage-retrieval management device 30 may not include a sensor for measuring degrees to which doors 22 are opened.

Information processor 33 performs information processing for managing food stored in refrigerator 20. Information processor 33 is implemented by a microcomputer, for example, but may be implemented by a processor or a dedicated circuit. Information processor 33 includes setter 37, determiner 38, and tracker 39, as functional elements. Functions of setter 37, determiner 38, and tracker 39 are realized by, for example, the microcomputer included in information processor 33, for instance, executing a computer program stored in memory 34. Details of the functions of setter 37, determiner 38, and tracker 39 will be described later.

Memory 34 is a storage device that stores therein a computer program executed by information processor 33 and various information items necessary for the above-stated information processing (such as setting information and food management information described later). Memory 34 is implemented by a semiconductor memory, for example.

Communicator 35 is a communication circuit for storage-retrieval management device 30 to communicate with server device 40 via wide-area communication network 60. Communicator 35 is, for example, a wireless communication circuit that performs wireless communication, but may be a wired communication circuit that performs wired communication. A communication standard of the communication performed by communicator 35 is not particularly limited.

Informer 36 gives notice when a type of food put into and taken out of refrigerator 20 cannot be determined. Informer 36 is implemented by a loudspeaker or a buzzer, for instance, and gives notice by outputting sound, but may be implemented by a light-emitting element such as a light emitting diode (LED) and may give notice by emitting light.

Server device 40 is a computer located outside of a building in which refrigerator 20 is placed, and is a cloud server, specifically. Server device 40 performs information processing for presenting information related to food stored in refrigerator 20. Server device 40 is an example of a notification device, and performs information processing for informing information related to food stored in refrigerator 20. Server device 40 includes communicator 41, information processor 42, and memory 43.

Communicator 41 is a communication circuit for server device 40 to communicate with storage-retrieval management device 30 and information terminal device 50 via wide-area communication network 60. Communicator 35 is, for example, a wired communication circuit that performs wired communication, but may be a wireless communication circuit that performs wireless communication. A communication standard of the communication performed by communicator 41 is not particularly limited.

Information processor 42 performs information processing for presenting or notifying information related to food stored in refrigerator 20. Information processor 42 is implemented by a microcomputer, for example, but may be implemented by a processor or a dedicated circuit. Information processor 42 includes presenter 44 and notifier 45, as functional elements. Functions of presenter 44 and notifier 45 are realized by, for example, the microcomputer included in information processor 42, for instance, executing a computer program stored in memory 43. Details of the functions of presenter 44 and notifier 45 will be described later.

Memory 43 is a storage device that stores therein a computer program executed by information processor 42 and various information items necessary for the above-stated information processing. Memory 43 is implemented by a semiconductor memory, for example.

Information terminal device 50 is possessed by the user. The user uses information terminal device 50 in order to receive notification from server device 40. Information terminal device 50 is a portable information terminal device such as a smartphone or a tablet terminal device, but may be a desktop information terminal device such as a personal computer.

Operation Example 1

Figure 3:
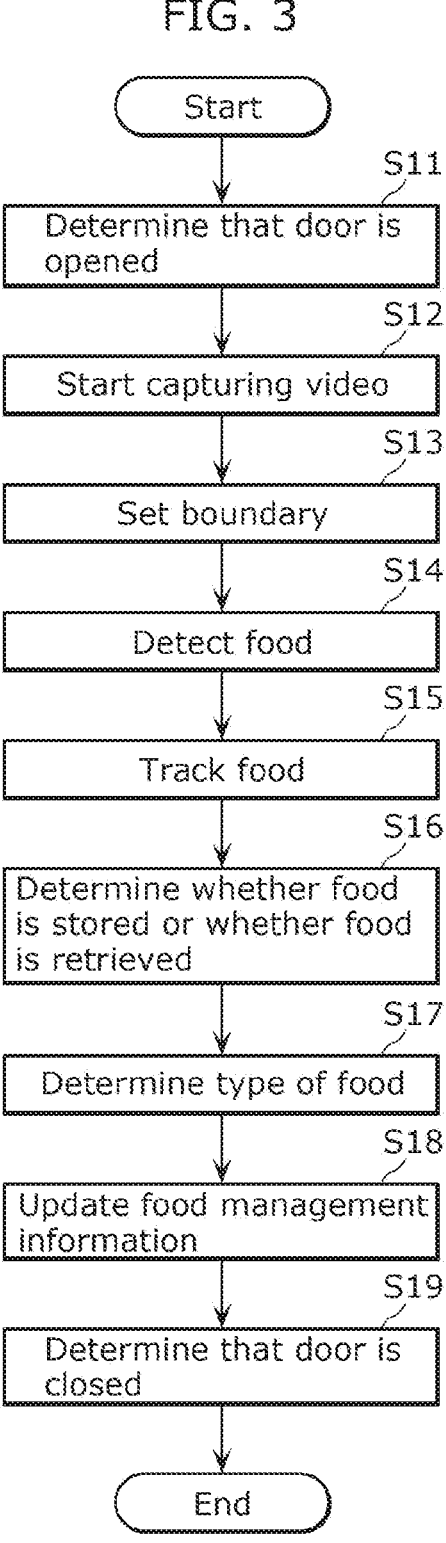
FIG. 3 is a flowchart showing Operation Example 1 of the storage-retrieval management system according to the embodiment.

Next, operation for managing storage and retrieval of food is to be described as Operation Example 1 of storage-retrieval management system 10. FIG. 3 is a flowchart showing Operation Example 1 of storage-retrieval management system 10.

Figure 4:
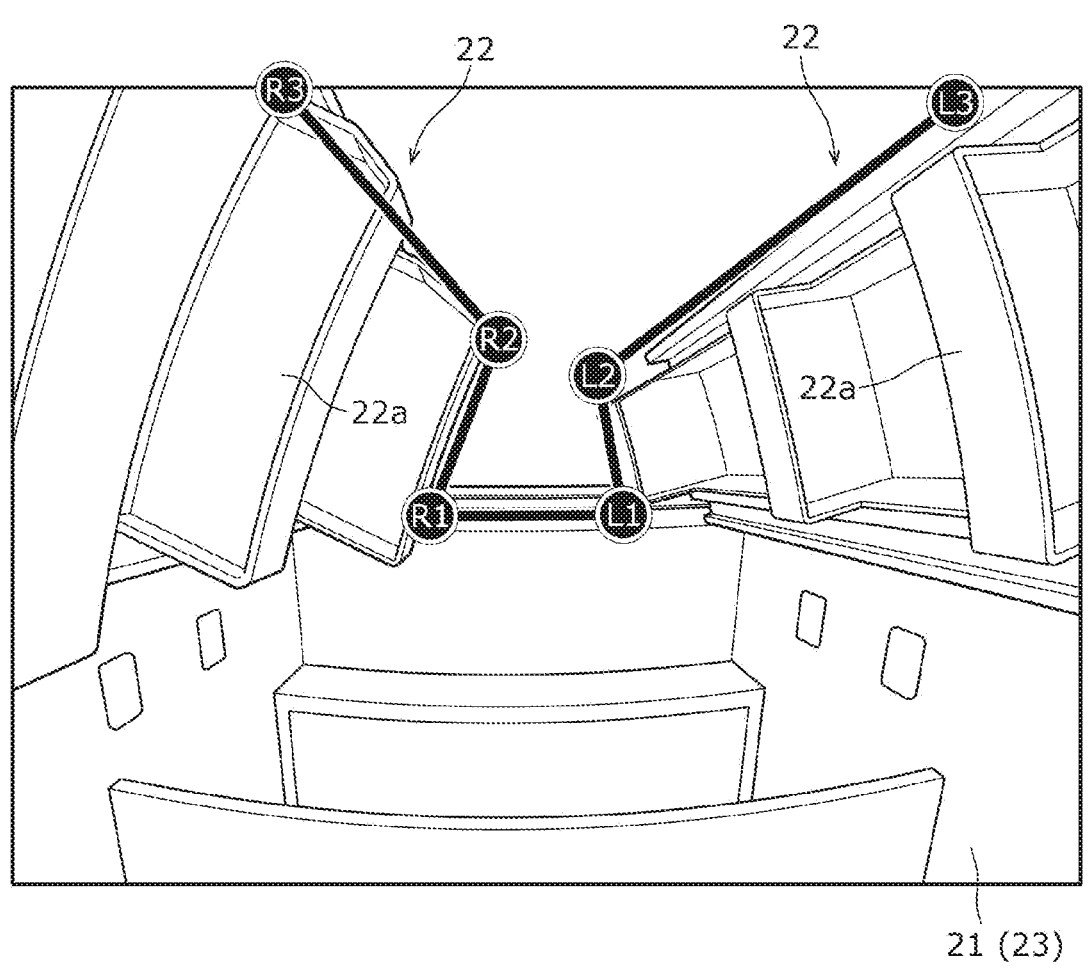
FIG. 4 illustrates an example of a video captured by an image capturer and an example of a boundary set in the video.

First, if determiner 38 determines that at least one of two doors 22 is opened, based on a result of measurement by distance measurer 32 (S11), image capturer 31 is activated and starts capturing a video (S12). FIG. 4 illustrates an example of a video captured by image capturer 31. As illustrated in FIG. 4, an image capturing area of image capturer 31 includes a portion of main body 21 (in other words, a portion of first storage space 23), and portions of two doors 22. Note that FIG. 4 also illustrates a boundary (a thick line) used to determine whether food is stored and whether food is retrieved. Yet, this boundary is not captured by image capturer 31, and is a virtual line.

Next, setter 37 sets a boundary along the contours of main body 21 and doors 22 in the video (S13). The boundary along the contours of main body 21 and doors 22 does not have a strict meaning, and means that the boundary roughly extends along the contours of main body 21 and doors 22. For example, as illustrated in FIG. 4, three points R1, R2, and R3 are provided on door 22 that is on the right when viewed from the user, and a boundary is set so as to pass through points L1, L2, and L3 on door 22 that is on the left when viewed from the user. The boundary is set to be a polygonal line that connects these six points. The boundary can also be said as indicating a border between refrigerator 20 and the floor in the video.

Figure 5:
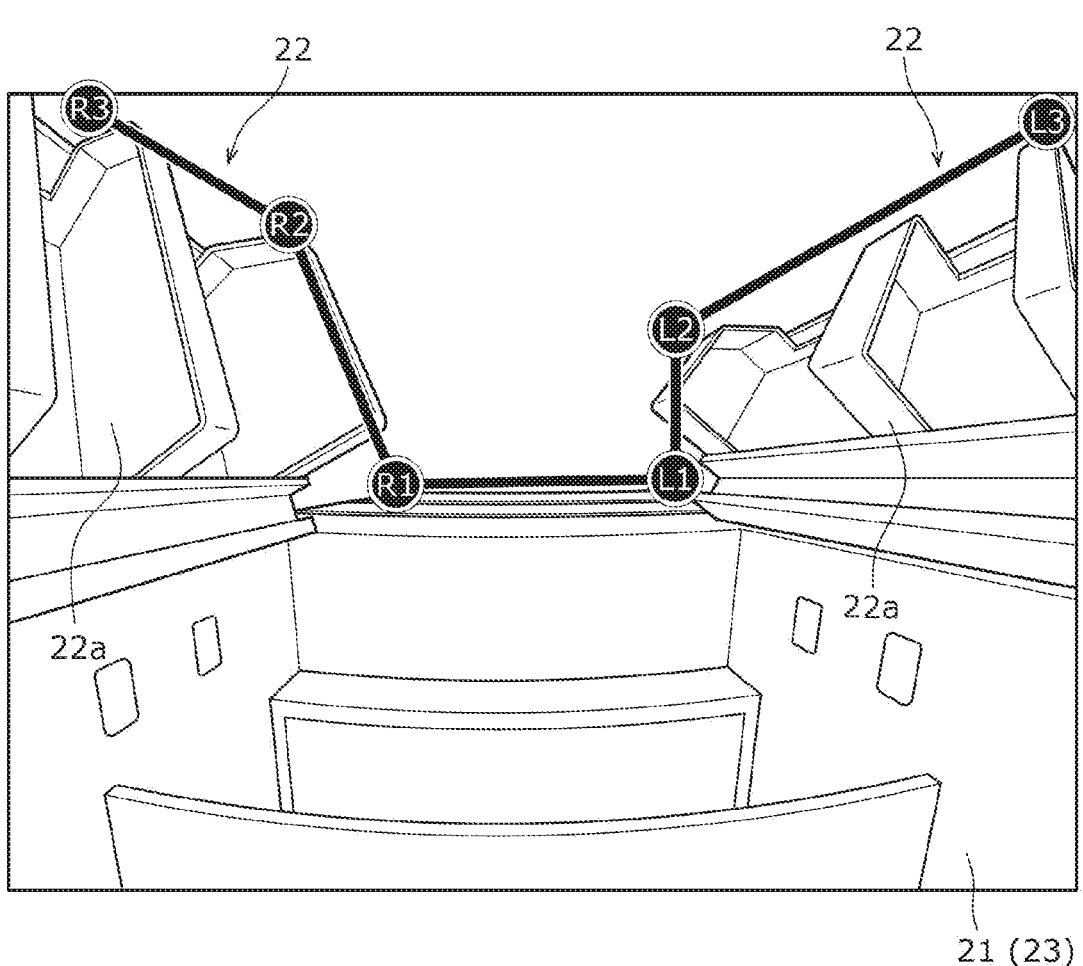
FIG. 5 illustrates another example of a video captured by the image capturer and another example of a boundary set in the video.

Note that setter 37 dynamically changes the boundary according to degrees to which doors 22 are opened. FIG. 5 illustrates a boundary when doors 22 are more widely opened than doors 22 in FIG. 4. In this manner, memory 34 prestores therein setting information for setting a boundary, in order to dynamically change the boundary according to the degrees to which doors 22 are opened. FIG. 6 illustrates an example of setting information. The numerical values in the setting information in FIG. 6 are temporary numerical values for explanation.

In the setting information, distances from distance measurer 32 to right door 22 are associated with coordinates of points R1, R2, and R3, and distances from distance measurer 32 to left door 22 are associated with coordinates of points L1, L2, and L3. Setter 37 can identify coordinates of points R1, R2, R3, L1, L2, and L3 corresponding to the results of measurement by distance measurer 32 in the setting information, and can set a polygonal line that connects the identified coordinates as a boundary. Note that in the setting information in FIG. 6, the degrees to which doors 22 are opened are divided into four levels, but may be divided into five or more levels, or may be divided into three levels or less.

In this manner, setter 37 can set one of boundary candidates predetermined using the setting information, according to the degrees to which doors 22 are opened. Note that for example, setter 37 obtains a mean value and variance of latest N measurement results (data items) (N is a natural number), and adopts the mean value as a valid distance only when the variance is a predetermined value or less.

Next, tracker 39 detects food captured in the video (S14), and tracks the detected food (S15). To detect food, various existing algorithms such as Regions with Convolutional Neural Networks (R-CNN) are used. Tracker 39 detects food (hereinafter also referred to as a tracking target) also in a frame (also referred to as a current frame) that comes subsequent to a frame (hereinafter, also referred to as a previous frame) in which the food detected in step S14, for example, is captured. Tracker 39 determines, out of food items captured in the current frame, food at a position closest to a position of the tracking target in the previous frame, as the tracking target that has been moved. By repeating such processes, tracker 39 can track the food detected in step S14.

Note that tracker 39 may further extract an image feature value of the food detected in step S14, and track the food using the image feature value as auxiliary information. Tracker 39 may determine a moved position of the tracking target, based on, for example, a distance between the food detected in the current frame and the tracking target, and a similarity between the image feature value detected in the current frame and that of the tracking target. Accordingly, the accuracy of tracking food can be improved.

Such a method of tracking food is an example, and another existing algorithm may be used to track food.

Next, determiner 38 determines whether food is stored or whether food is retrieved (S16). Determiner 38 determines that food being tracked is retrieved when the food is moved from refrigerator 20 to the indoor space beyond the boundary in the video. Determiner 38 determines that food that is a tracking target is stored when the food is moved from the indoor space to refrigerator 20 beyond the boundary in the video.

Note that when right door 22 of refrigerator 20 is closed, food being tracked will not be moved beyond the determined boundary for right door 22, and thus determination using the boundary determined for right door 22 will not be made. When left door 22 of refrigerator 20 is closed, food being tracked will not be moved beyond the boundary determined for left door 22, and thus determination using the boundary determined for left door 22 will not be made.

Next, determiner 38 determines a type of the food that is stored or retrieved (S17). Determiner 38 determines a type of the food using a machine learning model, for example. Examples of types of food include a drink, a vegetable, and meat, for instance, but types more finely classified may be used. Note that the type of food may be determined at the same time when the food is detected in step S14, and in this case, step S17 can be omitted.

Figures 7, 8:
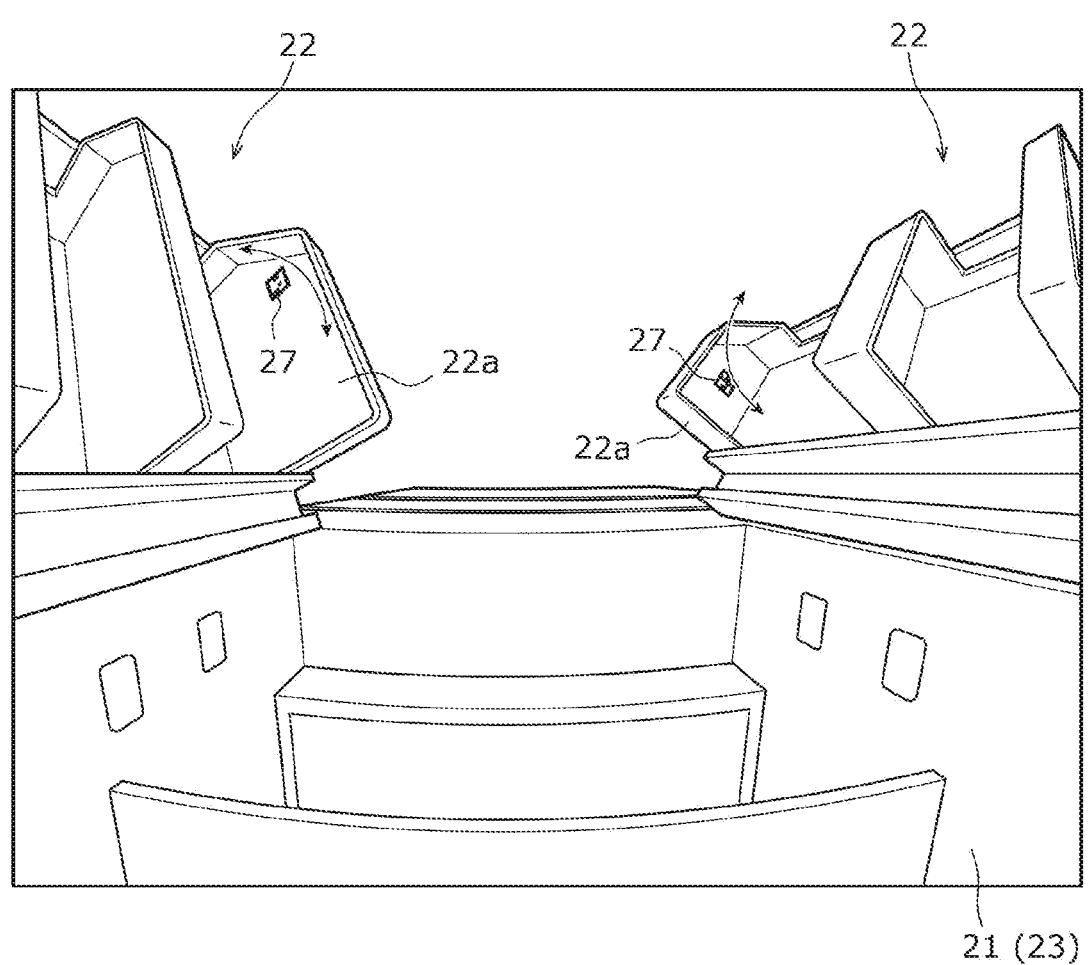
FIG. 7 illustrates an example of food management information.
FIG. 8 illustrates an example of a video captured by the image capturer when markers are provided in door compartments.

Next, determiner 38 updates food management information stored in memory 34, based on results of determination in steps S16 and S17 (S18). FIG. 7 illustrates an example of food management information. The food management information shows a breakdown of food items stored in refrigerator 20. As illustrated in FIG. 7, types and quantities of food items are associated in the food management information, for example. When determiner 38 determines that a drink is retrieved in steps S16 and S17, determiner 38 decrements the quantity of drinks in the food management information by one. When determiner 38 determines that a vegetable is stored in steps S16 and S17, determiner 38 increments the quantity of vegetables in the food management information by one.

After that, determiner 38 determines that two doors 22 are both closed, based on the results of measurement by distance measurer 32 (S19), operation ends.

As described above, storage-retrieval management system 10 (storage-retrieval management device 30) sets a boundary along contours of main body 21 and doors 22, and determines whether or not food captured in a video is stored into or retrieved from refrigerator 20 (whether food is stored into refrigerator 20 or whether food is retrieved from refrigerator 20), based on whether the food is moved beyond the boundary that is set. Storage-retrieval management system 10 can improve accuracy of determination as to whether food is stored into or retrieved from refrigerator 20, by setting a boundary along the contours of main body 21 and doors 22, as compared with the case where boundaries irrelevant to the contours are set. Storage-retrieval management system 10 can accurately determine storage of food into and retrieval of food from door compartments 22a, in particular.

Note that a method of setting a boundary along the contours of main body 21 and doors 22 is not limited to the above method. For example, setter 37 may set a boundary by performing image processing on a video. Specifically, setter 37 can extract contours of main body 21 and doors 22 by detecting edges from the video, and use the extracted contours as a boundary.

Alternatively, as illustrated in FIG. 8, if markers 27 are provided in portions of doors 22 or door compartments 22a that are included in an image-capturing area of image capturer 31, setter 37 can detect degrees to which doors 22 are opened by detecting trajectories along which markers 27 move and positions where markers 27 stop. FIG. 8 illustrates an example of a video captured by image capturer 31 when markers 27 are provided in door compartments 22a. In this case, setter 37 can set one of boundary candidates predetermined using the setting information, according to the detected degrees to which doors 22 are opened.

If determination of the type of food has failed in step S17, that is, when the type of food cannot be determined, determiner 38 may inform that determination of the type of food is impossible, using informer 36. For example, if informer 36 is implemented by a loudspeaker, informer 36 outputs an audio message, for instance, conveying that the type of food cannot be determined. If informer 36 is implemented by a light-emitting element, informer 36 informs that the type of food cannot be determined, by emitting light.

In this manner, if the determination of a type of food has failed and that failure is informed, the user can cope with the failure by manually correcting the food management information.

Operation Example 2

Figure 9:
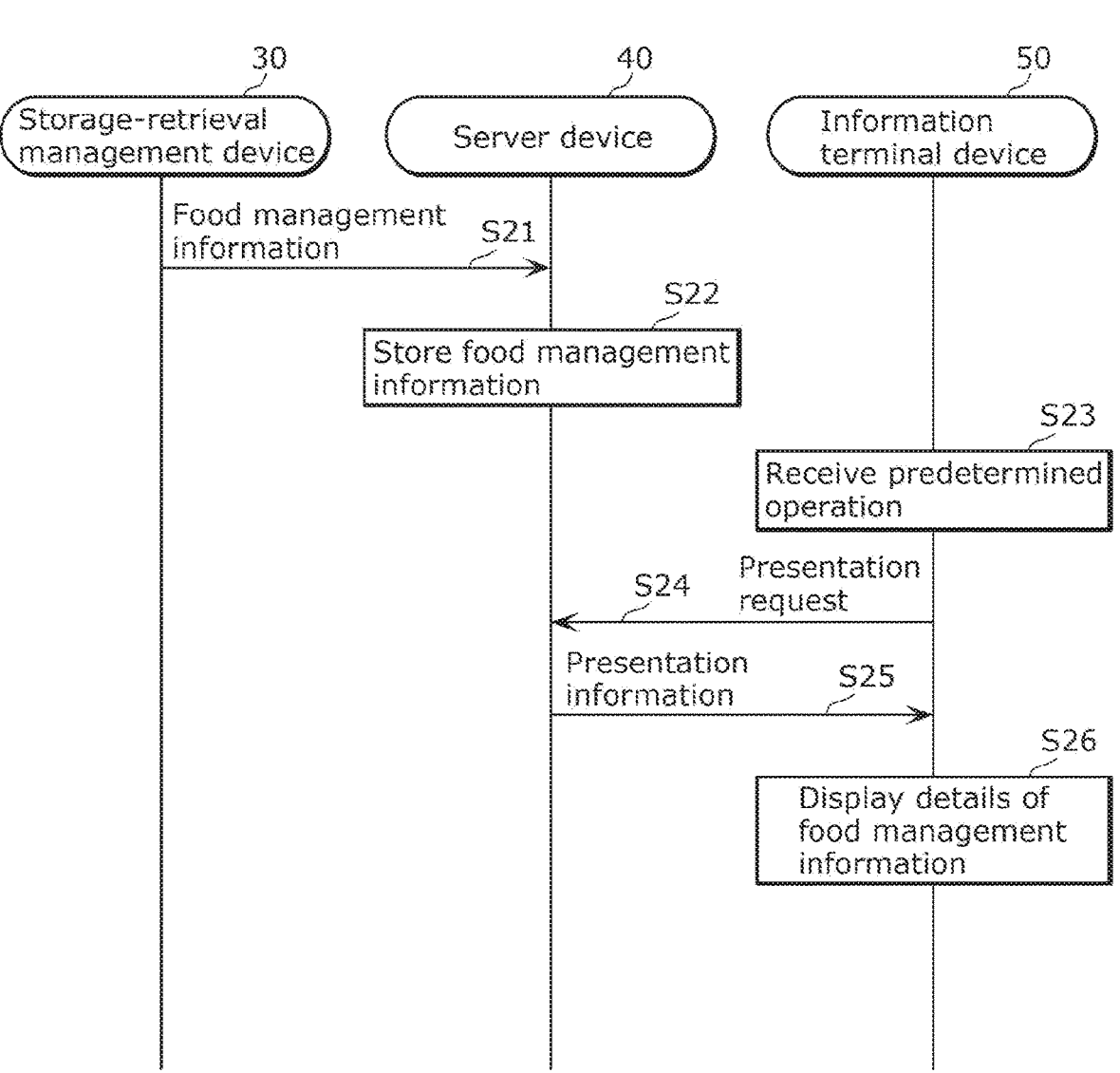
FIG. 9 is a sequence diagram of Operation Example 2 of the storage-retrieval management system according to the embodiment.

Next, as Operation Example 2 of storage-retrieval management system 10, operation for presenting food stored in refrigerator 20 is to be described. FIG. 9 is a sequence diagram of Operation Example 2 of storage-retrieval management system 10.

Communicator 35 of storage-retrieval management device 30 transmits food management information to server device 40 (S21). Communicator 41 of server device 40 receives the food management information, and presenter 44 stores the received food management information into memory 43 (S22). Communicator 35 of storage-retrieval management device 30 transmits food management information to server device 40 each time food storage determination or food retrieval determination is made, for example. Alternatively, communicator 35 of storage-retrieval management device 30 transmits food management information to server device 40 each time opened door 22 is closed. Accordingly, the updated food management information is stored into memory 43 of server device 40. Note that the food management information may be transmitted from storage-retrieval management device 30 to server device 40 periodically, such as once in a predetermined time.

On the other hand, when the user performs, on information terminal device 50 from, for instance, a place away from home, a predetermined operation for checking food stored in refrigerator 20 (details of food management information), information terminal device 50 receives such a predetermined operation (S23), and transmits a presentation request to server device 40, based on the received predetermined operation (S24).

Communicator 41 of server device 40 receives the presentation request. Presenter 44 transmits, to information terminal device 50, presentation information for presenting details of the food management information stored in memory 43, based on the received presentation request (S25). More specifically, communicator 41 transmits the presentation information.

Figure 10:
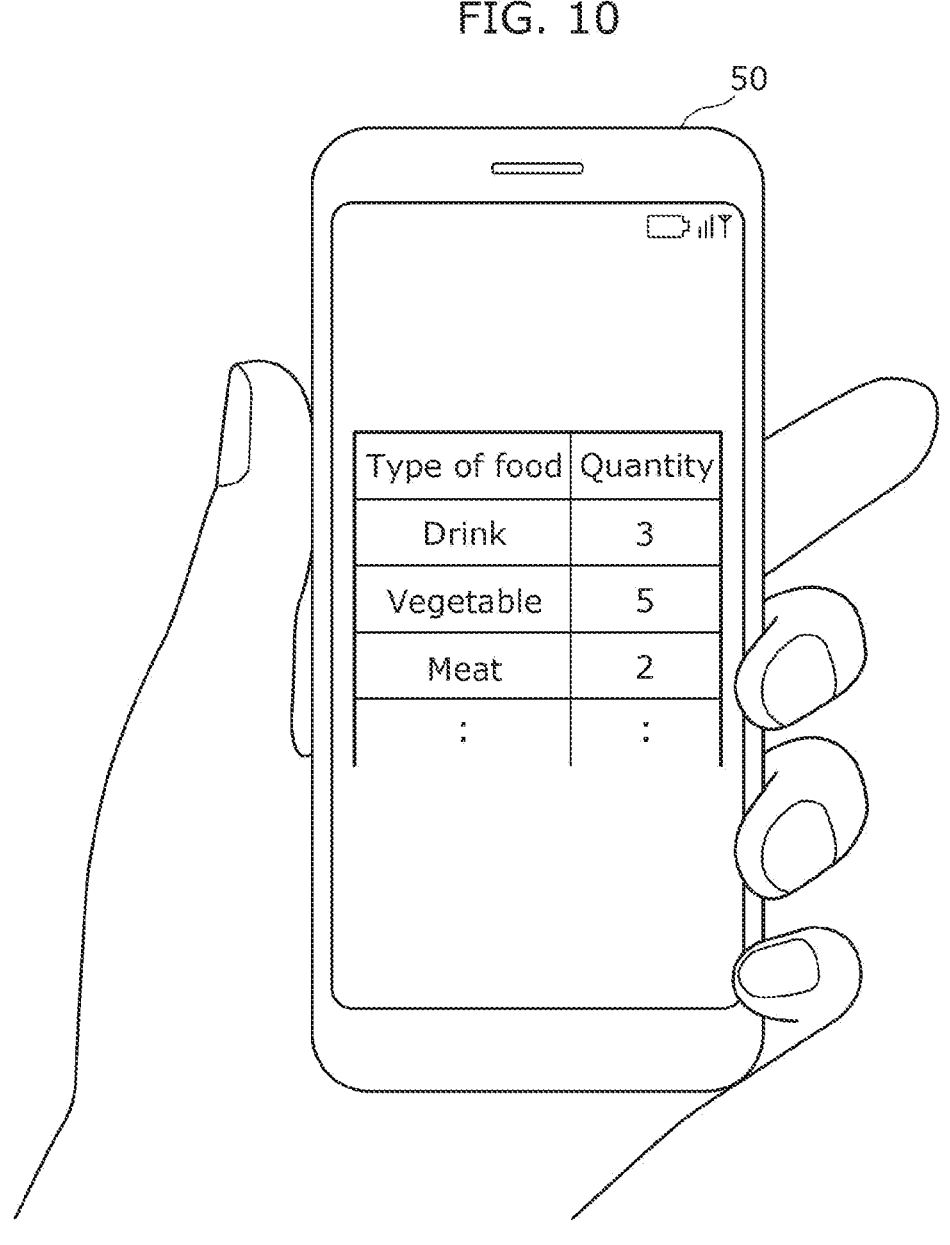
FIG. 10 illustrates an example of a display screen showing details of food management information.

Information terminal device 50 receives the presentation information, and causes a display included in information terminal device 50 to show a display screen showing details of the food management information, based on the received presentation information (S26). FIG. 10 illustrates an example of a display screen showing details of food management information.

In this manner, the user of storage-retrieval management system 10 can check food stored in refrigerator 20 in the user's house from the place away from home, for instance.

Operation Example 3

Figure 11:
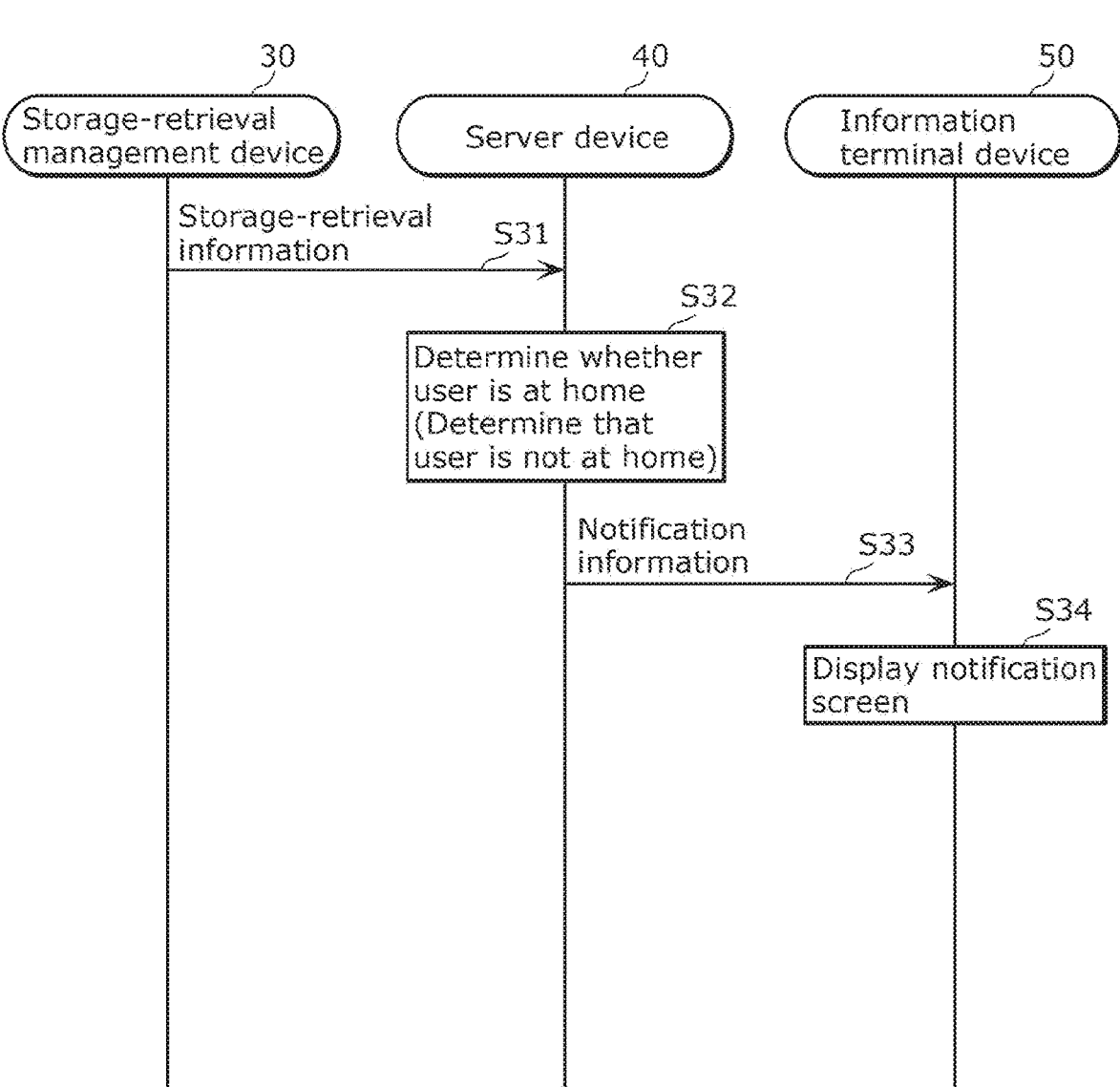
FIG. 11 is a sequence diagram of Operation Example 3 of the storage-retrieval management system according to the embodiment.

Next, as Operation Example 3 of storage-retrieval management system 10, an operation for notifying the user that food is stored into or retrieved from refrigerator 20 when the user is not at home is to be described. FIG. 11 is a sequence diagram of Operation Example 3 of storage-retrieval management system 10.

Communicator 35 of storage-retrieval management device 30 transmits storage-retrieval information to server device 40 each time food storage determination or food retrieval determination is made, for example (S31). Storage-retrieval information is an example of information indicating that food is put into or taken out of refrigerator 20.

Communicator 41 of server device 40 receives storage-retrieval information, and notifier 45 determines whether the user is at home (S32). Stated differently, notifier 45 determines whether storage-retrieval information is received during a period in which the user is not adjacent to refrigerator 20.

For example, information terminal device 50 includes a position measurer such as a Global Positioning System (GPS) module, and periodically transmits position information to server device 40. In this case, notifier 45 can determine whether the user is at home, based on the received position information. Note that the position (coordinates) of the user's house is registered in memory 43 in advance.

Instead of a method that uses position information, the user may report to server device 40 that the user is not at home by operating information terminal device 50. In this case, notifier 45 can regard execution of an away-from-home mode based on the above report as implying that the user is not at home.

When notifier 45 determines that the user is not at home, notifier 45 transmits notification information to information terminal device 50 (S33). More specifically, communicator 41 transmits notification information.

Figure 12:
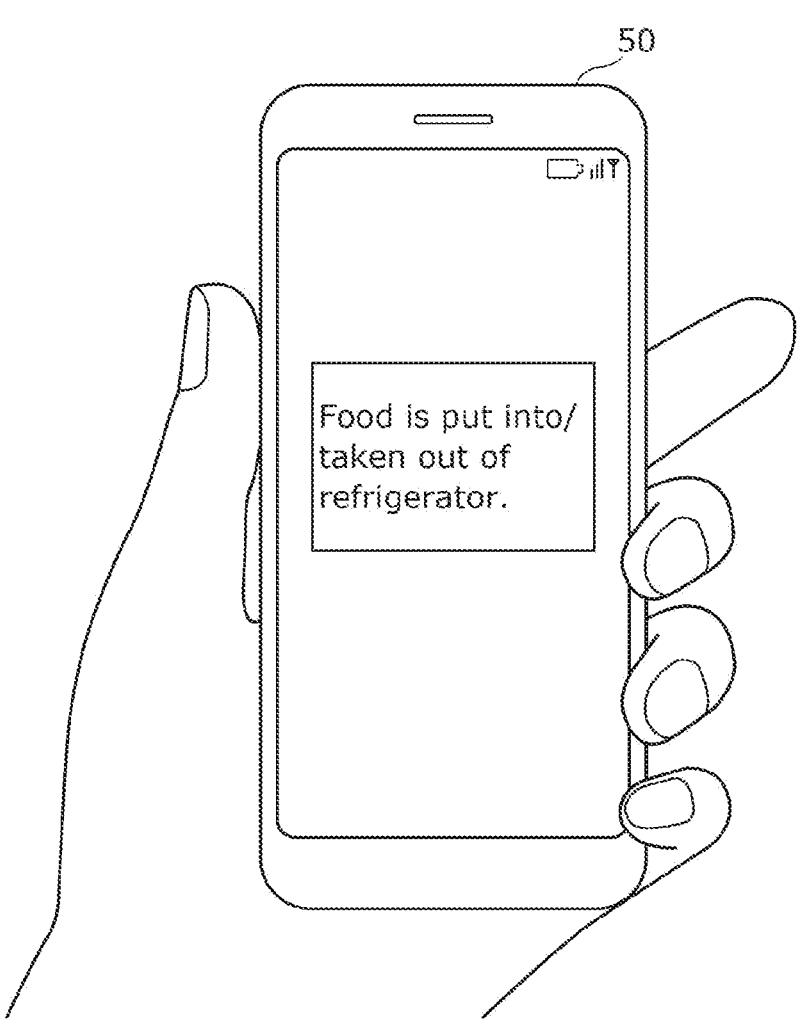
FIG. 12 illustrates an example of a notification screen.

Information terminal device 50 receives the notification information, and displays a notification screen, based on the received notification information (S34). FIG. 12 illustrates an example of a notification screen. On the other hand, when notifier 45 has determined in step S32 that the user is at home (has not gone out), processing in steps S33 and S34 is not performed.

In this manner, storage-retrieval management system 10 notifies information terminal device 50 possessed by the user when storage-retrieval information indicating that an object is stored into refrigerator 20 or an object is retrieved from refrigerator 20 during a period in which the user is not adjacent to refrigerator 20. Accordingly, the user can be aware that food is put into or taken out of refrigerator 20 during a period in which the user is not adjacent to refrigerator 20.

Variation

Figure 13:
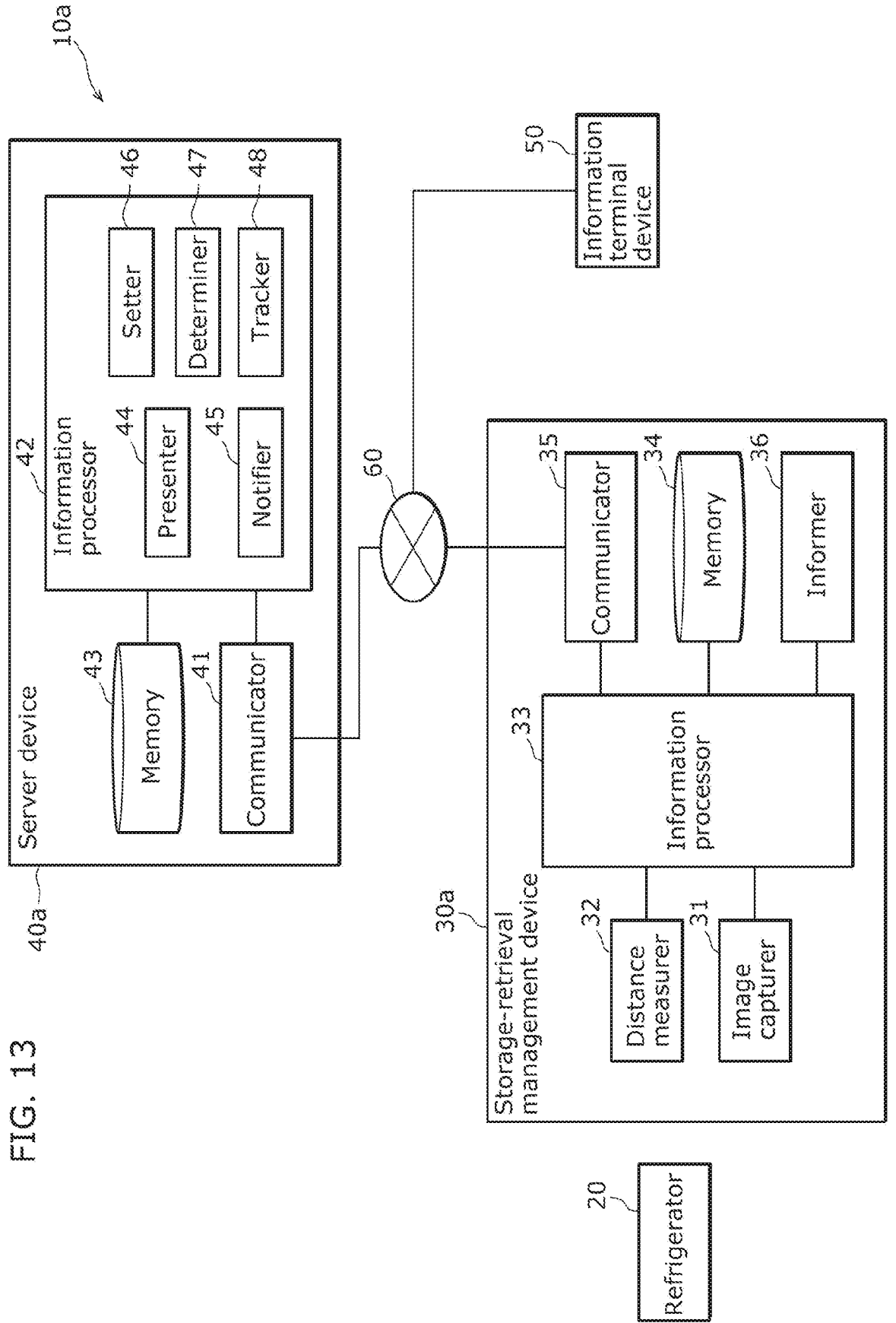
FIG. 13 is a block diagram illustrating a functional configuration of a storage-retrieval management system according to a variation.

In the above embodiment, processing from setting a boundary (step S13) to updating food management information (step S18) is performed by storage-retrieval management device 30, but may be performed by server device 40. FIG. 13 is a block diagram illustrating a functional configuration of a storage-retrieval management system according to such a variation.

As illustrated in FIG. 13, storage-retrieval management system 10a includes refrigerator 20, storage-retrieval management device 30a, server device 40a, and information terminal device 50. A difference from storage-retrieval management system 10 is that not storage-retrieval management device 30a, but server device 40a (more specifically, information processor 42) includes setter 46, determiner 47, and tracker 48. Setter 46 is an element having a substantially same function as that of setter 37, determiner 47 is an element having a substantially same function as that of determiner 38, and tracker 48 is an element having a substantially same function as that of tracker 39.

In such storage-retrieval management system 10a, server device 40a obtains, from storage-retrieval management device 30a, results of measurement by distance measurer 32 and videos captured by image capturer 31, for instance, to perform processing from setting a boundary (step S13) to updating food management information (step S18).

Note that part of processing from setting a boundary (step S13) to updating food management information (step S18) may be performed by storage-retrieval management device 30a, but the remaining part thereof may be performed by server device 40a.

Other Variations

In the above embodiments, refrigerator 20 may be a refrigerator for a typical household or may be a refrigerator for product display that is used in a shop such as a convenience store or may be a refrigerator for other business use.

In addition, if food items of a single type are stored in refrigerator 20, the type of the food items may not be determined.

Refrigerator 20 is an example of a repository, and the present disclosure can be implemented as other repositories that do not have a cooling function. In addition, items (in other words, objects) stored in a repository are not limited to food, and may be other items. The case where items other than food are stored in refrigerator 20 can also be conceived.

Advantageous Effects

As described above, storage-retrieval management device 30 includes: image capturer 31 that captures, from above refrigerator 20 that includes main body 21 and door 22 attached to main body 21, images of refrigerator 20 with door 22 in an open state; setter 37 that sets a boundary along contours of main body 21 and door 22 in the images; and determiner 38 that determines whether an object is stored into refrigerator 20 or whether the object is retrieved from refrigerator 20, based on whether the object is moved beyond the boundary that is set, the object being captured in one or more of the images. Refrigerator 20 is an example of a repository.

Such storage-retrieval management device 30 can improve accuracy of determining storage and retrieval of an object into/from refrigerator 20, as compared with the case where boundaries irrelevant to the contours of main body 21 and doors 22 are set.

For example, setter 37 sets, as the boundary, one of boundary candidates determined in advance, according to a degree to which door 22 is opened.

Such storage-retrieval management device 30 can set, as a boundary, one of boundary candidates determined in advance.

For example, setter 37 sets the boundary by performing image processing on the images.

Such storage-retrieval management device 30 can set a boundary by performing image processing on the images.

For example, determiner 38 further determines a type of the object. Storage-retrieval management device 30 further includes: informer 36 that gives notice when the type of the object is indeterminable.

By giving such notice from storage-retrieval management device 30, the user can cope with the case by manually correcting the food management information.

For example, image capturer 31 includes a structure with which image capturer 31 is retrofittable onto refrigerator 20.

Such image capturer 31 can be retrofitted onto refrigerator 20.

For example, storage-retrieval management system 10 includes: storage-retrieval management device 30; and server device 40. Server device 40 includes: communicator 41 that receives, from storage-retrieval management device 30, storage-retrieval information indicating that the object is stored into or retrieved from refrigerator 20; and notifier 45 that notifies information terminal device 50 possessed by a user of refrigerator 20 when the storage-retrieval information is received during a period in which the user is not adjacent to refrigerator 20.

With the notice from such storage-retrieval management system 10, the user can be aware that food is put into or taken out of refrigerator 20 during a period in which the user is not adjacent to refrigerator 20.

Storage-retrieval management system 10 includes: image capturer 31 that captures, from above refrigerator 20 that includes main body 21 and door 22 attached to main body 21, images of refrigerator 20 with door 22 in an open state; setter 37 that sets a boundary along contours of main body 21 and door 22 in the images; and determiner 38 that determines whether an object is stored into refrigerator 20 or whether the object is retrieved from refrigerator 20, based on whether the object is moved beyond the boundary that is set, the object being captured in one or more of the images. As in storage-retrieval management system 10a, setter 37 and determiner 38 (setter 46 and determiner 47) may be included in server device 40a.

Such storage-retrieval management system 10 can improve accuracy of determining storage and retrieval of an object into/from refrigerator 20, as compared with the case where boundaries irrelevant to the contours of main body 21 and doors 22 are set.

A storage-retrieval management method executed by a computer such as storage-retrieval management system 10 includes: capturing, from above refrigerator 20 that includes main body 21 and door 22 attached to main body 21, images of refrigerator 20 with door 22 in an open state; setting a boundary along contours of main body 21 and door 22 in the images; and determining whether an object is stored into refrigerator 20 or whether the object is retrieved from refrigerator 20, based on whether the object is moved beyond the boundary that is set, the object being captured in one or more of the images.

Such a storage-retrieval management method can improve accuracy of determining storage and retrieval of an object into/from refrigerator 20, as compared with the case where boundaries irrelevant to the contours of main body 21 and doors 22 are set.

Other Embodiments

Although the above has described embodiments, the present disclosure is not limited to the above embodiments.

For example, in the embodiments above, the storage-retrieval management system is implemented by a plurality of devices, but may be implemented by a single device. For example, the storage-retrieval management system may be implemented as a single device corresponding to the storage-retrieval management device according to the above embodiment, or may be implemented by a single device corresponding to a server device. When the storage-retrieval management system is implemented by a plurality of devices, how elements included in the storage-retrieval management system are distributed among the plurality of devices is not specifically determined.

For example, a method for communication between devices in the above embodiments is not limited in particular. In the communication between devices, a relay device not illustrated may be provided between the devices. A path for information transmission described in the above embodiment is not limited to the transmission paths illustrated in the sequence diagrams.

For example, in the above embodiment, processing executed by a particular processor may be executed by another processor. The order of processes may be changed or plural processes may be executed in parallel.

In the above embodiments, each of the elements may be implemented by executing a software program suitable for the element. Each element may be implemented by a program executor such as a CPU or a processor reading and executing a software program recorded on a recording medium such as a hard disk or semiconductor memory.

Further, each element may be implemented by hardware. For example, each element may be a circuit (or an integrated circuit). The circuits may constitute one circuit as a whole or may be separate circuits. These circuits may be general-purpose circuits or dedicated circuits.

General and specific aspects of the present disclosure may be implemented using a system, a device, a method, an integrated circuit, a computer program, or a computer-readable recording medium such as a CD-ROM. The general and specific aspects of the present disclosure may be implemented using any combination of systems, devices, methods, integrated circuits, computer programs, and recording media.

For example, the present disclosure may be implemented as an object storage-retrieval management method executed by a computer, or may be implemented as a program for causing a computer to execute the storage-retrieval management method. The present disclosure may be implemented as a non-transitory computer-readable recording medium having such a program recorded thereon.

The present disclosure also encompasses embodiments resulting from applying various modifications, which may be conceived by those skilled in the art, to the embodiments, and other embodiments resulting from combining elements and functions in the embodiments, without departing from the gist of the present disclosure.

REFERENCE SIGNS LIST

10, 10a storage-retrieval management system
20 refrigerator (repository)
21 main body
22 door
22a door compartment
23 first storage space
24 shelf
26 second storage space
30, 30a storage-retrieval management device
31 image capturer
32 distance measurer
33, 42 information processor
34, 43 storage
35, 41 communicator
36 informer
37, 44 setter

38, 47 determiner
39, 48 tracker
40, 40*a* server device (notification device)
44 presenter
45 notifier
50 information terminal device
60 wide-area communication network

The invention claimed is:

1. A storage-retrieval management device comprising:
one or more first memories; and
at least one first processor coupled to at least one of the one or more first memories and configured to perform:
capturing from above a repository that includes a main body and a door attached to the main body, images of the repository with the door in an open state;
setting a boundary in the images; and
determining whether an object is stored into the repository or whether the object is retrieved from the repository, based on whether the object is moved beyond the boundary that is set, the object being captured in one or more of the images, wherein when setting the boundary, a line along contours of the main body and the door is set as the boundary, and the boundary includes a first portion along the door in the open state and a second portion along the main body, the second portion being different from the first portion.

2. The storage-retrieval management device according to claim 1,
wherein the setting comprises performing, on the images, image processing for detecting the contours, and setting the boundary based on the contours detected.

3. The storage-retrieval management device according to claim 2,
wherein the at least one first processor is further configured to perform extracting the contours by detecting a border between the repository and a floor with use of edge detection processing as the image processing.

4. The storage-retrieval management device according to claim 1,
wherein the determining further comprises determining a type of the object, and
the at least one first processor is further configured to perform informing that gives notice when the type of the object is indeterminable.

5. A storage-retrieval management system comprising:
the storage-retrieval management device according to claim 1; and
a notification device,
wherein the notification device includes:
one or more second memories; and
at least one second processor coupled to at least one of the one or more second memories and configured to perform:
receiving, from the storage-retrieval management device, information indicating that the object is stored into or retrieved from the repository; and
notifying an information terminal device possessed by a user of the repository when the information is received during a period in which the user is not adjacent to the repository.

6. A storage-retrieval management system comprising:
the storage-retrieval management device according to claim 1; and
the repository.

7. The storage-retrieval management device according to claim 1,
wherein
the line set as the boundary is a line that connects at least three points on the contours.

8. The storage-retrieval management device according to claim 1, wherein the boundary line is a polygonal line that includes the first portion and the second portion.

9. The storage-retrieval management device according to claim 1, wherein the first portion is a polygonal line.

10. A storage-retrieval management device comprising:
one or more first memories; and
at least one first processor coupled to at least one of the one or more first memories and configured to perform:
capturing from above a repository that includes a main body and a door attached to the main body, images of the repository with the door in an open state;
setting, as a boundary in the images, a line along contours of the main body and the door selected from one of boundary candidates determined in advance, according to a degree to which the door is opened; and
determining whether an object is stored into the repository or whether the object is retrieved from the repository, based on whether the object is moved beyond the boundary that is set, the object being captured in one or more of the images.

11. The storage-retrieval management device according to claim 10,
wherein the setting comprises performing, on the images, image processing for detecting the contours, and setting the boundary based on the contours detected.

12. The storage-retrieval management device according to claim 10,
wherein the determining further comprises determining a type of the object, and
the at least one first processor is further configured to perform informing that gives notice when the type of the object is indeterminable.

13. A storage-retrieval management method comprising:
capturing from above a repository that includes a main body and a door attached to the main body, images of the repository with the door in an open state;
setting a boundary in the images; and
determining whether an object is stored into the repository or whether the object is retrieved from the repository, based on whether the object is moved beyond the boundary that is set, the object being captured in one or more of the images, wherein when setting the boundary, a line along contours of the main body and the door is set as the boundary, and the boundary includes a first portion along the door in the open state and a second portion along the main body, the second portion being different from the first portion.

14. A non-transitory computer-readable recording medium having recorded thereon a program for causing a computer to execute the storage-retrieval management method according to claim 13.

* * * * *